US009887964B2

(12) United States Patent
Lowenberg et al.

(10) Patent No.: US 9,887,964 B2
(45) Date of Patent: Feb. 6, 2018

(54) METHOD AND SYSTEM FOR DYNAMIC DE-IDENTIFICATION OF DATA SETS

(71) Applicant: MasterCard International Incorporated, Purchase, NY (US)

(72) Inventors: Todd Lowenberg, Redding, CT (US); Curtis Villars, Chatham, NJ (US); Andrew Reiskind, Armonk, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 162 days.

(21) Appl. No.: 14/694,262

(22) Filed: Apr. 23, 2015

(65) Prior Publication Data

US 2016/0315925 A1    Oct. 27, 2016

(51) Int. Cl.
*G06F 11/30* (2006.01)
*H04L 29/06* (2006.01)

(52) U.S. Cl.
CPC ................. *H04L 63/0421* (2013.01)

(58) Field of Classification Search
CPC .............. H04L 63/062; H04L 63/10
See application file for complete search history.

(56) References Cited

U.S. PATENT DOCUMENTS

| 8,719,193 | B1 | 5/2014 | Iannace |
| 8,978,153 | B1* | 3/2015 | Cuthbertson ......... H04L 9/0825 726/26 |
| 2012/0151597 | A1 | 6/2012 | Gupta et al. |
| 2012/0303616 | A1 | 11/2012 | Abuelsaad et al. |
| 2013/0024242 | A1 | 1/2013 | Villars et al. |
| 2014/0025483 | A1 | 1/2014 | Villars et al. |
| 2014/0207663 | A1 | 7/2014 | Iannace |
| 2014/0287723 | A1 | 9/2014 | Lafever et al. |
| 2015/0040245 | A1* | 2/2015 | Guha ................... G06Q 30/08 726/28 |

OTHER PUBLICATIONS

International Search Report and Written Opinion issued by the Korean Intellectual Property Office in PCT/US2016/028328 (10 Pgs).
U.S. Appl. No. 14/333,971, entitled "Method and System for Maintaining Privacy in Scoring of Consumer Spending Behavior," by Curtis Villars, et al., filed Jul. 17, 2014.

* cited by examiner

*Primary Examiner* — Mohammed Waliullah
(74) *Attorney, Agent, or Firm* — Buchanan Ingersoll & Rooney PC

(57) ABSTRACT

A method for combining disparate data sets using dynamic de-identifiers includes: receiving a first data set from a first external entity, the data set including first data entries including attribute values, and wherein the first data set does not include any personally identifiable information; receiving a second data set from a second external entity, the data set including second data entries including attribute values, and wherein the second data set does not include any personally identifiable information; identifying a dynamic de-identifier (DDID) for each first data entry and second data entry; matching each second data entry to a first data entry based on a correspondence between the associated attribute values; identifying insights for at least one first data entry based on at least the attribute values included in the corresponding matched second data entry; and transmitting at least the identified insights to the first external entity.

42 Claims, 8 Drawing Sheets

METHOD AND SYSTEM FOR DYNAMIC DE-IDENTIFICATION OF DATA SETS

FIELD

The present disclosure relates to the de-identification of data sets, specifically the combining of two disparate data sets using dynamic de-identifiers to provide for combined data sets without the use or possession of any personally identifiable information.

BACKGROUND

Data about individuals can be very valuable, not only for those that use the data, such as advertisers, content providers, merchants, retailers, etc., but also for those that collect the data as it can provide for a profitable revenue stream, as well as the consumers themselves whose data is collected as they can benefit from receiving content, advertisements, offers, etc. that are more personalized to their own interests. As a result, there is a large industry focused on capturing personal data from a wide variety of sources, including, but not limited to, transactions, geolocations, demographics, biometrics, data usage, media consumption, etc.

However, while some people welcome the capturing of their personal data for use in personalized offers and content, others are uncomfortable with the capture and usage of data that is personally identifiable to themselves. As a result, some techniques have been created that remove personally identifiable information from a data set, or that combine data for multiple consumers into a single data set, to prevent the usage of personally identifiable information. Such techniques and their benefits and usage can be found in U.S. Pat. No. 8,719,193, entitled "Systems and Methods for Analysis and Linkage Between Different Transaction Data Providers," by Marianne Iannace; U.S. Patent Publication No. 2014/0025483, entitled "System and Method for Protecting Consumer Privacy in the Measuring of the Effectiveness of Advertisements," by Curtis Villars, et al.; U.S. Patent Publication No. 2013/0024242, entitled "Protecting Privacy in Audience Creation," by Curtis Villars et al.; and U.S. patent application Ser. No. 14/333,971, entitled "Method and System for Maintaining Privacy in Scoring of Consumer Spending Behavior," by Curtis Villars, et al., filed on Jul. 17, 2014, all of which are herein incorporated by reference in their entirety.

One such method involves the use of a "measurement key" to uniquely identify data in a data set, such as data associated with a specific individual in a set of consumer data, where the measurement key is a unique value that is not personally identifiable to the associated person. For example, the measurement key may be a hash of an identification number, such that the hash cannot be converted back into the identification number and is therefore not personally identifiable to the associated individual. In such methods, the measurement key is often a persistent value. Unfortunately, in some instances, a higher degree of privacy protection may be desired, or even required, than is provided by the use of a persistent identifier, especially in jurisdictions where persistent identifiers may be deemed to be personal identifiers.

As a result, a method for generating a dynamic de-identifier has been developed that is designed to protect a set of data to keep it "dynamically anonymous" for as long as desired, as discussed in detail in U.S. Patent Publication No. 2014/0287723, entitled "Mobile Applications for Dynamic De-Identification and Anonymity," by Malcolm LaFever, et al., which is herein incorporated by reference in its entirety. A dynamic de-identifier can be used in place of a measurement key or other type of persistent identifier to provide for traditional uses of a set of data (e.g., for measuring advertising effectiveness, creation of microsegments or audiences, etc.), while providing for a higher level of privacy protection. However, these methods often use the dynamic de-identifier when providing a single set of data, which already contains personally identifiable information, to a third party with the personally identifiable information removed. Such methods may be ineffective in instances where no personally identifiable information may be possessed at any time, particularly in instances where disparate data sets are to be combined by one or both of the parties without the use of any personally identifiable information or persistent identifiers.

Thus, there is a need for a technical solution to combine two disparate data sets without the use or possession of personally identifiable information in order to achieve a higher level of privacy protection, via the use of dynamic de-identifiers such that no personally identifiable information or persistent identifiers are used during the process.

SUMMARY

The present disclosure provides a description of systems and methods for combining disparate data sets using dynamic de-identifiers.

A method for combining disparate data sets using dynamic de-identifiers includes: receiving, by a receiving device of a processing system, a first data set from a first entity external to the processing system, wherein the first data set includes a plurality of first data entries, each first data entry including a plurality of attribute values and an associated identification key, and wherein the first data set does not include any personally identifiable information; receiving, by the receiving device of the processing system, a second data set from a second entity external to the processing system, wherein the second data set includes a plurality of second data entries, each second data entry including a plurality of attribute values and an associated identification key, and wherein the second data set does not include any personally identifiable information; identifying a dynamic de-identifier (DDID) for each identification key included in each first data entry in the first data set and each second data entry in the second data set, wherein the DDID is one of: (i) based on the corresponding identification key, or (ii) equivalent to the corresponding identification key; matching, by a processing device of the processing system, each second data entry included the second data set to a first data entry included in the first data set based on a correspondence between the identified DDIDs corresponding to the respective associated identification keys; identifying, by the processing device of the processing system, one or more insights for at least one first data entry included in the first data set based on at least the plurality of attribute values included in the corresponding matched second data entry; and transmitting, by a transmitting device of the processing system, at least the identified one or more insights to the first entity external to the processing system.

Another method for combining disparate data sets using dynamic de-identifiers includes: receiving, by a receiving device of a processing system, a first data set from a first entity external to the processing system, wherein the first data set includes a plurality of first data entries, each first data entry including a plurality of attribute values, and wherein the first data set does not include any personally identifiable information; receiving, by the receiving device of the processing system, a second data set from a second entity external to the processing system, wherein the second data set includes a plurality of second data entries, each second data entry including a plurality of attribute values, and wherein the second data set does not include any personally identifiable information; identifying a dynamic de-identifier (DDID) for each first data entry in the first data set and each second data entry in the second data set; matching, by a processing device of the processing system, each second data entry included the second data set to a first data entry included in the first data set based on a correspondence between one or more of the plurality of attribute values included in each respective data entry; identifying, by the processing device of the processing system, one or more insights for at least one first data entry included in the first data set based on at least the plurality of attribute values included in the corresponding matched second data entry; and transmitting, by a transmitting device of the processing system, at least the identified one or more insights to the first entity external to the processing system.

A system for combining disparate data sets using dynamic de-identifiers includes a processing system including a receiving device, a first processing device, a second processing device, and a transmitting device. The receiving device is configured to receive: a first data set from a first entity external to the processing system, wherein the first data set includes a plurality of first data entries, each first data entry including a plurality of attribute values and an associated identification key, and wherein the first data set does not include any personally identifiable information; and a second data set from a second entity external to the processing system, wherein the second data set includes a plurality of second data entries, each second data entry including a plurality of attribute values and an associated identification key, and wherein the second data set does not include any personally identifiable information. The first processing device is configured to identify a dynamic de-identifier (DDID) for each identification key included in each first data entry in the first data set and each second data entry in the second data set, wherein the DDID is one of: (i) based on the corresponding identification key, or (ii) equivalent to the corresponding identification key. The second processing device is configured to: match each second data entry included the second data set to a first data entry included in the first data set based on a correspondence between the identified DDIDs corresponding to the respective associated identification keys; and identify one or more insights for at least one first data entry included in the first data set based on at least the plurality of attribute values included in the corresponding matched second data entry. The transmitting device is configured to transmit at least the identified one or more insights to the first entity external to the processing system.

Another system for combining disparate data sets using dynamic de-identifiers includes a processing system including a receiving device, a first processing device, a second processing device, and a transmitting device. The receiving device is configured to receive: a first data set from a first entity external to the processing system, wherein the first data set includes a plurality of first data entries, each first data entry including a plurality of attribute values, and wherein the first data set does not include any personally identifiable information; and a second data set from a second entity external to the processing system, wherein the second data set includes a plurality of second data entries, each second data entry including a plurality of attribute values, and wherein the second data set does not include any personally identifiable information. The first processing device is configured to identify a dynamic de-identifier (DDID) for each first data entry in the first data set and each second data entry in the second data set. The second processing device is configured to: match each second data entry included the second data set to a first data entry included in the first data set based on a correspondence between one or more of the plurality of attribute values included in each respective data entry; and identify one or more insights for at least one first data entry included in the first data set based on at least the plurality of attribute values included in the corresponding matched second data entry. The transmitting device is configured to transmit at least the identified one or more insights to the first entity external to the processing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Personally identifiable information (PII)-PII may include information that may be used to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. Systems and methods apparent to persons having skill in the art for rendering potentially personally identifiable information anonymous may be used in conjunction with the methods and systems discussed herein, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing system 102 does not possess the PII or be able to decrypt the encrypted PII.

System for Combining Disparate Data Sets Using Dynamic De-Identifiers

Figure 1A:
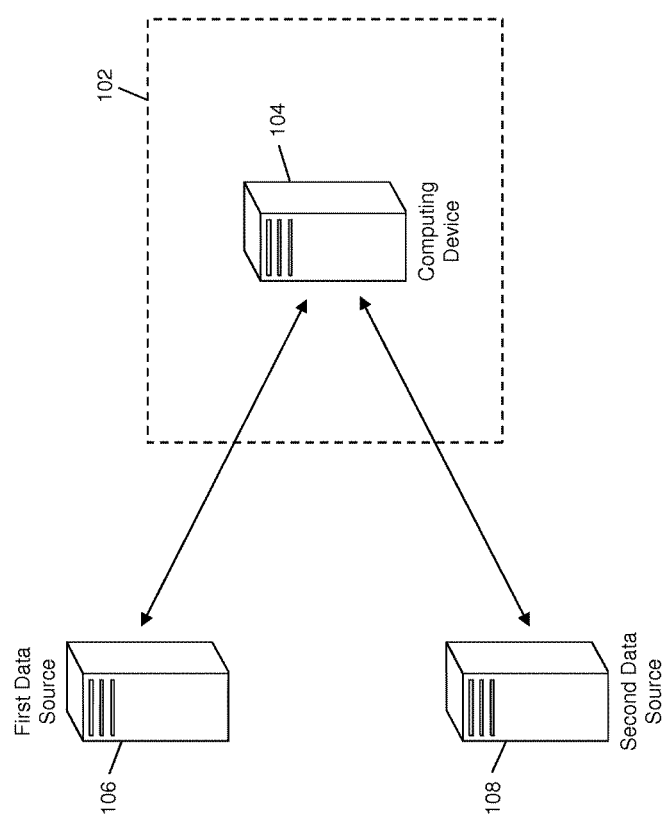
FIGS. 1A and 1B are block diagrams illustrating high level system architectures for combining disparate data sets using dynamic de-identifiers in accordance with exemplary embodiments.
Figure 1B:
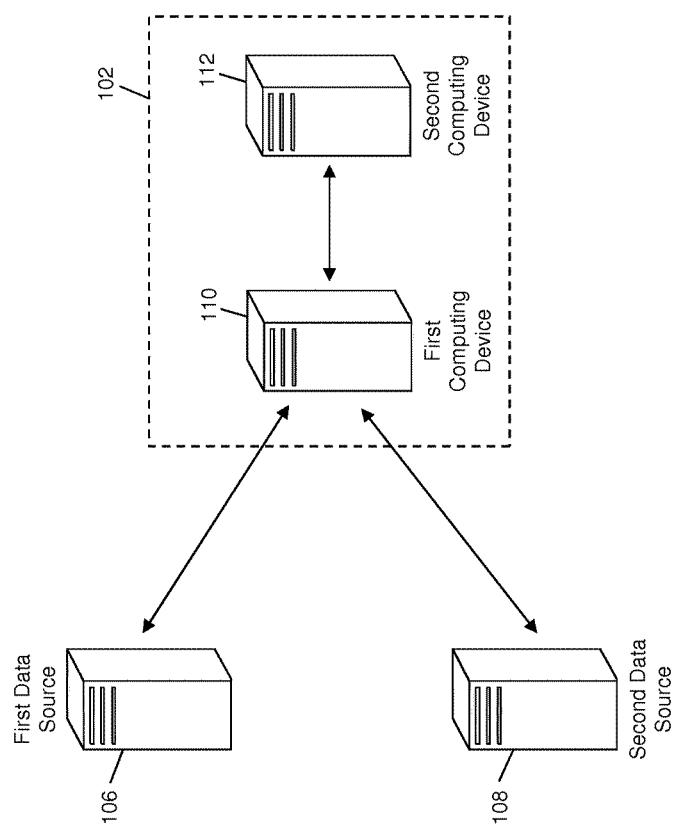

FIGS. 1A and 1B illustrate systems 100 for the combining of two disparate data sets using dynamic de-identifiers such that personally identifiable information (PII) is not used or possessed during the receipt and combination of the data sets.

The system 100 may include a processing system 102. The processing system 102 may be comprised of a computing device 104. The computing device 104, discussed in more detail below, may be configured to combine disparate data sets via the use of dynamic de-identifiers such that the processing system 102 does not receive or possess any personally identifiable information. The computing device 104 may receive a first data set from a first data source 106. The first data source 106 may be external to the processing system 102 such that if the first data source 106 is in possession of any PII, it will be inaccessible by the processing system 102 and the computing device 104. The first data set may include a plurality of data entries, where each data entry includes a plurality of attribute values.

For example, the first data set may include transaction data, with each data entry being associated with a consumer and including a plurality of purchase behaviors as attribute values based on the consumer's transaction data. In another example, the first data set may include location data, with each data entry being associated with a cellular communication network user and including a plurality of geographic locations and associated times associated as attribute values that were read from a mobile communication device (e.g., via the global positioning system, mobile application data, etc.) associated with the respective user. In yet another example, the first data set may include Internet data usage, with each data entry being associated with a computing device user and including a plurality of data usage values as attribute values based on the user's usage of the Internet. Additional data that may be included in data sets provided to the processing system 102 may include demographic data, biometric data, media consumption data, physical activity data, computer usage data, mobile device usage data, wearable computing device data, etc.

The computing device 104 may receive a second data set from a second data source 108. The second data source 108 may also be external to the processing system 102 such that if the second data source 108 possess any PII, it may be inaccessible by the processing system 102 and the computing device 104. The second data set may be comprised of a plurality of data entries that include attribute values are disparate from the attribute values included in the data entries in the first data set provided by the first data source 106, such that the first data set and the second data set are disparate data sets.

The computing device 104 may be configured to combine the first data set and the second data set via matching one or more data entries from the first data set, herein referred to as "first data entries," to one or more data entries from the second data set, herein referred to as "second data entries." In some embodiments, each data entry may include an identification key. The identification key may be a value associated with the respective data entry suitable for use in identification thereof. The computing device 104 may be configured to identify a dynamic de-identifier (DDID) for each of the first and second data entries in the respective first and second data sets. In some embodiments, the DDID may be based on the corresponding identification key. In other embodiments, each identification key may be a DDID, and may be identified as such by the computing device 104, such as in embodiments where the first data source 106 and second data source 108 generate and provide DDIDs.

In some embodiments, the identification key may be a persistent identifier. In such embodiments, the computing device 104 may be configured to identify a DDID for each data entry based on the including identification key upon receipt of the data, and may replace, discard, remove, obscure, etc. the identification key set such that the processing system 102 does not receive or possess a persistent identifier. In some instances, the computing device 104 may provide the corresponding DDIDs to the first data source 106 and the second data source 108 for each of the first data entries and second data entries, respectively, such as for use in matching data provided by the computing device 104 to the data entries by the external data sources.

The computing device 104 may then match first data entries from the first data set to second data entries included in the second data set based on a correspondence between the associated DDIDs. In some instances, a first data entry may have a DDID corresponding to multiple second data entries, or vice versa. In some embodiments, the computing device 104 may be configured to store information as a result of the association, such as relational data, a shared data entry, etc. The computing device 104 may then identify insights based on the matched data. Insights identified by the computing device 104 may be based on the attribute values included in each of the data sets.

For instance, in a first example, each data set may include transaction data for an unidentified consumer or group (e.g., microsegment) of consumers. The computing device 104 may match transaction data from a first data entry associated with a consumer to disparate transaction data from a second data entry also associated with a consumer using the DDIDs, and may identify one or more insights based on the matched transaction data. For example, the computing device 104 the first data entries may correspond to income while the second data entries may correspond to expenditures, and the computing device 104 may identify that an increase in spending by the associated unidentified consumer was due to a bonus or due to an increase in salary.

In a second example, the first data set may include transaction data for an unidentified consumer or group of consumers while the second data set may include geographic location data for the same consumers or groups of consumers. In this example, the computing device 104 may match the transaction data to the geographic location data using the DDIDs and may identify insights, such as that consumers making purchases for one type of product (e.g., electronics) travel further to make such purchases than consumers making purchases for another type of product (e.g., groceries). It will be apparent to persons having skill in the relevant art that the insights identified by the computing device 104 may vary based on the types of data included in each data set as well as the data included in the attribute values included therein. For instance, insights identified by the computing device 104 for data sets that include transaction data may differ if an attribute value is or is not included that includes a time and/or date for the transaction.

In some embodiments, received data sets may not include identification keys. In such embodiments, the computing device 104 may be configured to match first data entries to second data entries using the respective attribute values included therein. For instance, if each data set includes data entries associated with transaction data for a consumer, but does not include an identification key, the computing device 104 may match the data entries based on common attribute values, such as common transaction time and/or dates and merchants. In such instances, attribute values may not be identification keys due to a lack of uniqueness or a commonality, but may, when aggregated, provide for a linkage between two data entries.

In some instances, the computing device 104 may be configured to provide a measurement associated with an identified linkage or matching between two data entries, such as to represent a likelihood, strength, or confidence of a match. For example, if five of ten transactions have common attribute values in a first and second data entry, the computing device 104 may consider it a 50% match, whereas if nine of ten transactions have common attribute values, the computing device 104 may consider it a 90% match. In some cases, the computing device 104 may only consider two data entries matched for use in the identification of insights if the measurement exceeds a predetermined threshold. For instance, if the threshold was 80% in the above example, only pairs of data entries that have at least eight transactions having common attribute values may be matched for use in identifying insights. In some embodiments, the computing device 104 may also be configured to take matching measurements into account when identifying insights.

In another example, the first data set may include data entries associated with transaction data and the second data set may include data entries associated with geographic locations, with one or both data sets not including identification keys. In such an instance, the computing device 104 may identify matches between data entries based on matching attribute values of transactions to geographic locations, such as transaction locations and times to geographic locations and times. In yet another example, data sets for demographic data and biometric data may be matched based on commonality of attribute values, such as demographics and biometrics that are indicative of gender, age, etc.

In some embodiments, the first data set and second data set may each include identification keys, but the identification keys may correspond to different persistent identifiers. In such an embodiment, the computing device 104 may be configured to match the first data entries to second data entries based on correspondence between the attribute values, such as discussed above, without the use of identification keys. For example, the first data source 106 may be a mobile network operator that provides geographic location data to the processing system 102 where the first data entries are associated with mobile devices and include telephone numbers as identification keys, and the second data source 108 may be a financial institution that provides transaction data to the processing system 102 where the second data entries are associated with transaction accounts as identification keys. In such an example, the identification keys may not overlap such that data entries may not be matched using the identification keys. The computing device 104 may therefore match the data entries using the included attribute values, without use of the identification keys. In some instances, the identification keys in such a case may be removed or may not be provided in results of the methods discussed herein. In embodiments where one data set has identification keys and the other data set does not have any identification keys, the computing device 104 may also match the data entries using attribute values, and refrain from usage of the identification keys.

After the computing device 104 has identified insights, the computing device 104 may provide the insights to the first data source 106 or the second data source 108. In some embodiments, the insights may be provided without any additional information. In other embodiments, the insights may be accompanied by associated identifications keys and/or DDIDs. For instance, if an insight is identified for a specific data entry (e.g., associated with a specific consumer or group of consumers), the insight may be provided and accompanied with the corresponding DDID or identification key. In some instances, an insight may be provided with the corresponding data entries, such as in instances where no identification key was associated. For example, if the first data set includes transaction data and the second data set includes demographic data, the computing device 104 may provide a transaction data entry to the first data source 106 accompanied with an insight regarding the associated unidentified consumer's demographics based on their transaction behavior, and/or the computing device 104 may provide a demographic data entry to the second data source 108 accompanied with an insight regarding the associated unidentified consumer's spending behavior based on their demographics, as a result of the matching and insights.

In some embodiments, the processing system 102 may utilize multiple computing devices, in order to further increase privacy protection. As illustrated in FIG. 1B, in such an embodiment, the computing device 104 may be replaced in the processing system 102 by a first computing device 110 and a second computing device 112. In this embodiment, the functions of the computing device 104 may be separated among the first computing device 110 and the second computing device 112 in order to further enhance the protection of privacy in the matching of the two disparate data sets.

The first computing device 110 may be configured to receive the first data set and the second data set from the first data source 106 and the second data source 108, respectively. The first computing device 110 may be configured to identify DDIDs associated with each data entry in the respective data sets, such as by using identification keys. In instances where each data entry may not include an identification key, the first computing device 110 may identify and assign DDIDs that are not based on any included attribute values. The first computing device 110 may be configured to provide the data entries to the second computing device 112. In some embodiments, the DDIDs may not be provided to the second computing device 112.

The second computing device 112 may be configured to perform matching of the first data entries to the second data entries and the corresponding identification of insights. The second computing device 112 may then provide the insights to the first computing device 110. In such an instance, the first computing device 110 may not possess any data associated with the matching of the two data sets, such that the data sets possessed by the first computing device 110 may remain disparate. The first computing device 110 may then provide the insights to the respective data sources.

In such embodiments, the processing system 102 may also apply logical and administrative controls to operation and management of the processing system 102. For instance, administrative controls may be established such that users of the first computing device 110 may not use the second computing device 112 and vice versa, such that no single user has access to both computing devices and therefore may not have access to all of the data. Similarly, logical controls may be applied to the computing devices to ensure that the data sets remain disparate.

The methods and systems discussed herein may provide for increased privacy protection in the combining of disparate data sets via the use of dynamic de-identifiers and the techniques discussed herein. The methods discussed herein enable the processing system 102 to combine the disparate data sets without ever being in possession of personally identifiable information, which may provide for a significant increase in data security and privacy protection not available using existing methods. In addition, the use of multiple computing devices, as illustrated in FIG. 1B, may provide even greater privacy protection. The use of the multiple computing devices may enable matching of the disparate data sets to be performed where no identification keys or DDIDs are possessed in the same device as the matched data, thus further increasing privacy. As a result, the methods and systems discussed herein provide for multiple levels of privacy protection that are greatly increased over those available using existing methods and systems in the combination of disparate data sets and providing of insights based thereon.

Computing Device

Figure 2:
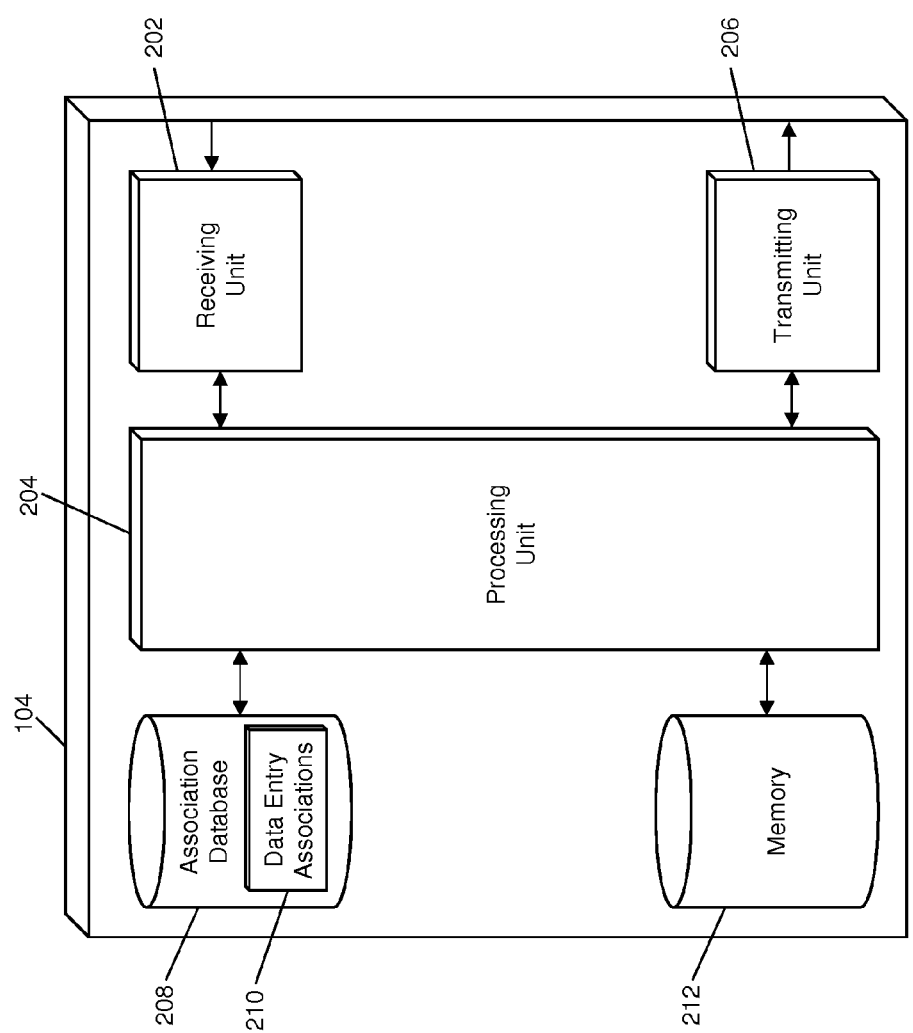
FIG. 2 is a block diagram illustrating the computing device of FIG. 1 for combining disparate data sets using dynamic de-identifiers in accordance with exemplary embodiments.

FIG. 2 illustrates an embodiment of the computing device 104 of the processing system 102 in the system 100. It will be apparent to persons having skill in the relevant art that the embodiment of the computing device 104 illustrated in FIG. 2 is provided as illustration only and may not be exhaustive to all possible configurations of the computing device 104 suitable for performing the functions as discussed herein. For example, the computer system 700 illustrated in FIG. 7 and discussed in more detail below may be a suitable configuration of the computing device 104.

The computing device 104 may include a receiving unit 202. The receiving unit 202 may be configured to receive data over one or more networks via one or more network protocols. The receiving unit 202 may receive the first data set from the first data source 106 and the second data set from the second data source 108. In some embodiments, the first data set and the second data set may be received using different protocols, networks, and/or communication methods.

The computing device 104 may also include a processing unit 204. The processing unit 204 may be configured to perform the functions of the computing device 104 discussed herein as will be apparent to persons having skill in the relevant art. The processing unit 204 may be configured to identify DDIDs for data entries included in the received data sets. In some embodiments, the processing unit 204 may be configured to identify DDIDs directly upon receipt of the data by the receiving unit 202 such that no persistent identifier is stored in the computing device 104 or processing system 102. DDIDs may be identified by the processing unit 204 using methods and systems that will be apparent to persons having skill in the relevant art.

The processing unit 204 may also be configured to match first data entries to second data entries, using associated DDIDs and/or included attribute values, as discussed above. In some instances, the processing unit 204 may be configured to match a single first data entry to a single second data entry or to multiple second data entries, or vice versa. In other instances, the processing unit 204 may match multiple first data entries to multiple second data entries, such that the processing unit 204 does not perform any one-to-one matching of data entries. In some cases, the type of matching may be based on the included data and privacy considerations. For instance, biometric data may not be matched one-to-one with other biometric data or with location data, but may be matched one-to-one with transaction data. In some instances, the first data source 106 and/or second data source 108 may specify the type of matching that may be performed with the provided data set.

The processing unit 204 may also be configured to identify insights. Insights may be identified based on attribute values included in one or more first data entries and the attribute values included in one or more second data entries matched to the one or more first data entries. As discussed above, insights identified by the processing unit 204 may be based on the type of data included in each data set, the types of attribute values included in each data entry, and the attribute values themselves. In some instances, the first data source 106 and/or second data source 108 may request one or more specific insights to be identified by the processing unit 204, which may be included in a request received by the receiving unit 202 (e.g., and accompanying the respective data set).

In some embodiments, the computing device 104 may include an association database 208. The association database 208 may be configured to store a plurality of data entry associations 210. The data entry associations 210 may include data regarding associations of first data sets to second data sets, such as associations of DDIDs, associated attribute values, or combined data entries. In some instances, data entry associations 210 may also include any insights identified by the processing unit 204 associated with the respective first or second data entry.

The computing device 104 may further include a transmitting unit 206. The transmitting unit 206 may be configured to transmit data over one or more networks via one or more network protocols. The transmitting unit 206 may transmit insights and any other data to the first data source 106 and/or second data source 108. In some instances, the transmitting unit 206 may also transmit data entries, DDIDs, and/or identification keys, such as to accompany one or more insights. In some embodiments, the transmitting unit 206 may also be configured to transmit data requests to the first data source 106 and/or second data source 108, such as requests for additional data entries or attribute values, requests for specification of insights, etc. In some instances, the transmitting unit 206 may be configured to transmit DDIDs identified by the processing unit 204 to the respective data source, such as in instances when a DDID is identified upon receipt of a data set that includes an identification key. In such an instance, the DDID may be accompanied by the associated identification key or data entry, such as for use in identification by the appropriate data source.

The computing device 104 may also include a memory 212. The memory 212 may be configured to store data suitable for performing the functions of the computing device 104 discussed herein. For example, the memory 212 may be configured to store communication protocol data, insight identification rules and/or algorithms, attribute value matching rules and/or algorithms, rules and/or algorithms for generating DDIDs, etc. Additional data that may be stored in the memory 212 will be apparent to persons having skill in the relevant art.

In instances where the processing system 102 may include multiple computing devices, such as illustrated in FIG. 1B, each of the computing devices (e.g., first computing device 110 and second computing device 112) may include at least some or each of the components of the computing device 104 as illustrated in FIG. 2 and discussed herein suitable for use in performing the requisite functions of the respective computing device.

Processes for Combining Disparate Data Sets Using Dynamic De-Identifiers

Figure 3:
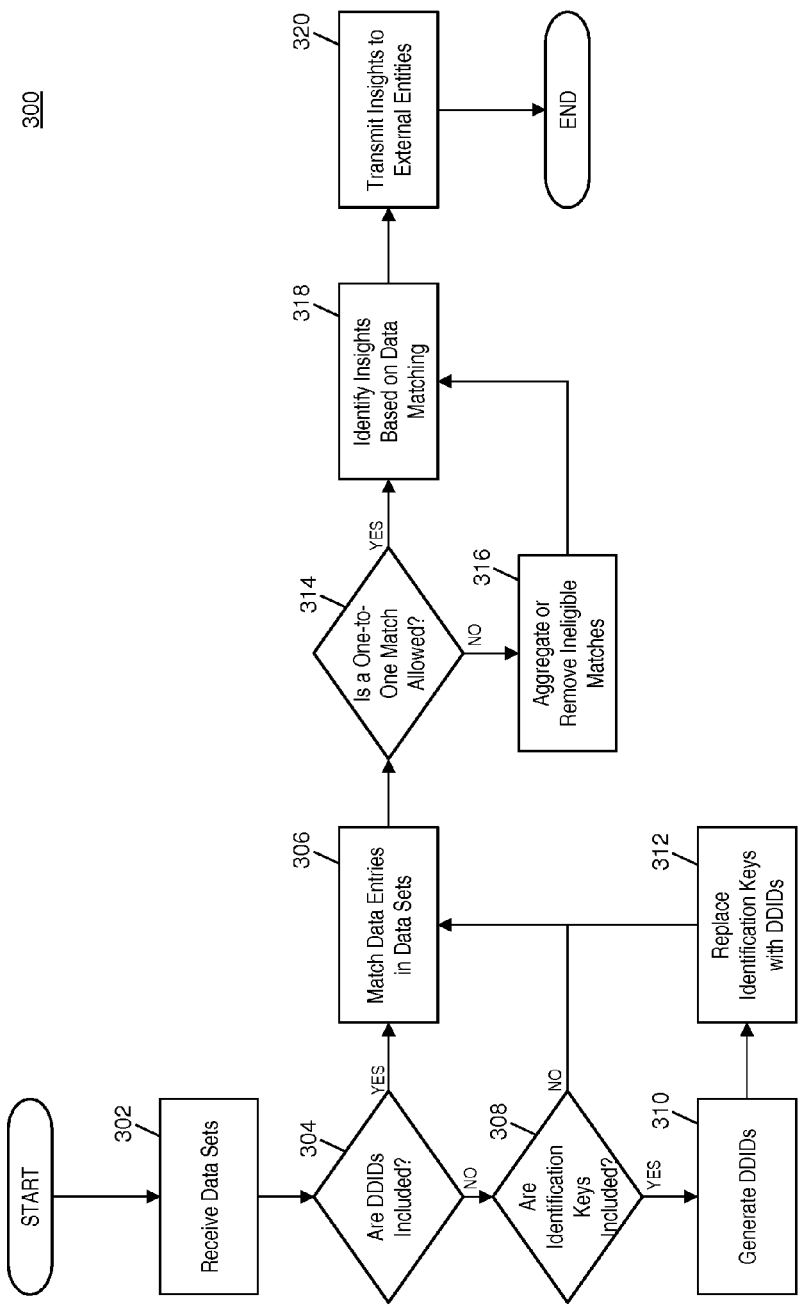
FIG. 3 is a flow diagram illustrating a process for combining disparate data sets using dynamic de-identifiers using the computing device of FIG. 2 in accordance with exemplary embodiments.

FIG. 3 illustrates a process 300 for the combining of two disparate data sets using dynamic de-identifiers without the use of personally identifiable information using the computing device 104 illustrated in the system 100 in FIG. 1A.

In step 302, the receiving unit 202 of the computing device 104 may receive a first data set from the first data source 106 and a second data set from the second data source 108. Each data set may include a plurality of data entries, each data entry including a plurality of associated attribute values. In step 304, the processing unit 204 of the computing device 104 may determine if DDIDs are included in the received data entries. If DDIDs are included, then the process 300 may proceed to step 306 where the first data entries included in the first data set may be matched to the second data entries included in the second data set by the processing unit 204. If, in step 304, the processing unit 204 determines that DDIDs are not included, then, in step 308, the processing unit 204 may determine if the data entries include identification keys.

If no identification keys are included, or if the identification keys are different (e.g., do not overlap, or may otherwise not be suitable for matching) then the process may proceed to step 306 for matching of the data entries. In some instances, the processing unit 204 may still generate DDIDs for each data entry to be used for reference. If, in step 308, the processing unit 204 determines that identification keys are included, then, in step 310, the processing unit 204 may generate DDIDs for each of the data entries. In step 312, the processing unit 204 may replace the identification key in each data entry with the identified DDID. In some embodiments, the transmitting unit 206 of the computing device 104 may transmit the DDIDs to the appropriate data source. In some instances, the transmission may include the accompanying identification keys. In some embodiments, step 312 may include the disposal of each identification key such that the computing device 104 and processing system 102 may not possess any identification keys.

In step 306, matching of the first data entries to the second data entries may be performed. In some instances, the DDIDs may be used for matching, such as if there are common DDIDs included in first data entries in the first data set and second data entries in the second data set. In other instances, the processing unit 204 may match the data entries based on a correspondence between the attribute values included in each of the data entries in the respective data set. Once the data entries have been matched, then, in step 314, the processing unit 204 may determine if a one-to-one match is allowed. The allowability of a one-to-one match may be based on information stored in the memory 212 of the computing device 104 (e.g., based on privacy considerations) or received by the receiving unit 202, such as from the first data source 106 and/or second data source 108. If no one-to-one match is allowed, then, in step 316, the processing unit 204 may remove any ineligible one-to-one matches from the data, such as by removal of the association or by aggregation of one-to-one matches or the attribute values included therein with other matches, such as by combining two matches with similar attribute values.

Once the matches have been made and are suitable, then, in step 318, the processing unit 204 may identify insights based on the matched data. The insights may be based on attribute values included in each first data entry or entries and the corresponding matched second data entry or entries. As discussed above, insights that are identified may be based on requests from the first data source or second data source and may be dependent on the types of data sets received, the types of attribute values included in each data entry, and the values of the attribute values themselves. In step 320, the transmitting unit 206 may transmit the identified insights to the respective external entities (e.g., the first data source 106 and/or the second data source 108). In some embodiments, the insights may be accompanied by associated DDIDs and/or data entries.

Figure 4:
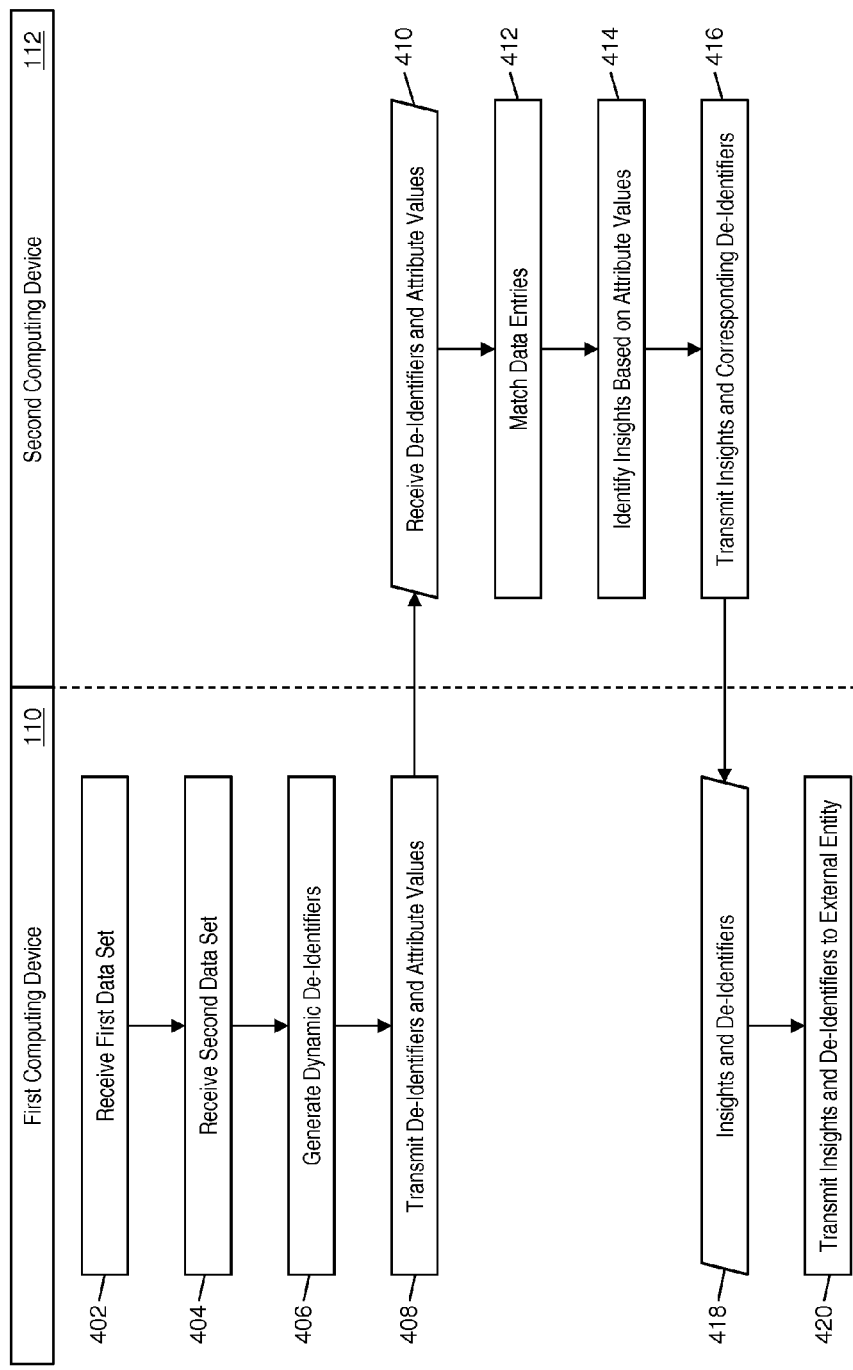
FIG. 4 is a flow diagram illustrating a process for combining disparate data sets using dynamic de-identifiers using the processing system of FIG. 1B in accordance with exemplary embodiments.

FIG. 4 illustrates a process for the combining of two disparate data sets using dynamic de-identifiers without the use of personally identifiable information using the first computing device 110 and the second computing device 112 of the processing system 102 illustrated in the system 100 in FIG. 1B.

In step 402, the receiving unit 202 of the first computing device 110 may receive the first data set from the first data source 106. In step 404, the receiving unit 202 of the first computing device 110 may receive the second data set from the second data source 108. Each of the data sets may include a plurality of data entries, each of which may include a plurality of attribute values. In some embodiments, each data entry may also include an identification key.

In step 406, the processing unit 204 of the first computing device 110 may generate a DDID for each data entry in both of the received data sets. In embodiments where the data entries may include identification keys, the DDIDs may be the identification keys themselves, or may be based on the identification keys. In other embodiments, such as if one or more data set does not include identification keys, or if identification keys for each data set do not overlap, the DDIDs may be generated based on one or more attribute values included in the respective data entry, or may not be based or utilize any data specific to the respective data entry. In step 408, the transmitting unit 206 of the first computing device 110 may transmit the DDIDs and associated data entries and attribute values to the second computing device 112. In some embodiments, the DDIDs may not be transmitted to the second computing device 112.

In step 410, the receiving unit 202 of the second computing device 112 may receive the attribute values and, if applicable, may also receive the DDIDs. In step 412, the processing unit 204 of the second computing device 112 may match the first data entries in the first data set to the second data entries in the second data set. In instances where the DDIDs are included and are based on identification keys, the matching may be based on a correspondence between DDIDs included in first data entries and second data entries. In other instances, the matching may be based on a correspondence between attribute values included in the first data entries and attribute values included in the second data entries. In some instances, matching may still be based on attribute values even if identification keys were provided to the first computing device 110, so that the second computing device 112 will not possess DDIDs to further increase privacy protection.

Once the matching has been performed, then, in step 414, the processing unit 204 of the second computing device may identify one or more insights based on the attribute values included in the matched sets of data entries. In some instances, insights may be related to specific data entries and/or matched sets of data entries, specific attribute values, or may be based on the data set as a whole. In step 416, the transmitting unit 206 of the second computing device 112 may transmit the insights to the first computing device 110. In instances where DDIDs were provided to the second computing device 112, the insights may be transmitted with the associated DDIDs. In other instances, insights may be transmitted with associated data entries.

In step 418, the receiving unit 202 of the first computing device 110 may receive the insights and, if applicable, the associated DDIDs and/or data entries. In step 420, the transmitting unit 206 of the first computing device 110 may transmit the identified insights and their associated DDIDs to the respective external data source. In instances where the second computing device 112 did not provide the DDIDs with the insights, the processing unit 204 of the first computing device 110 may identify the DDIDs corresponding to each insight based on the accompanying data sets prior to transmission of the insights to the external data source.

Figure 5:
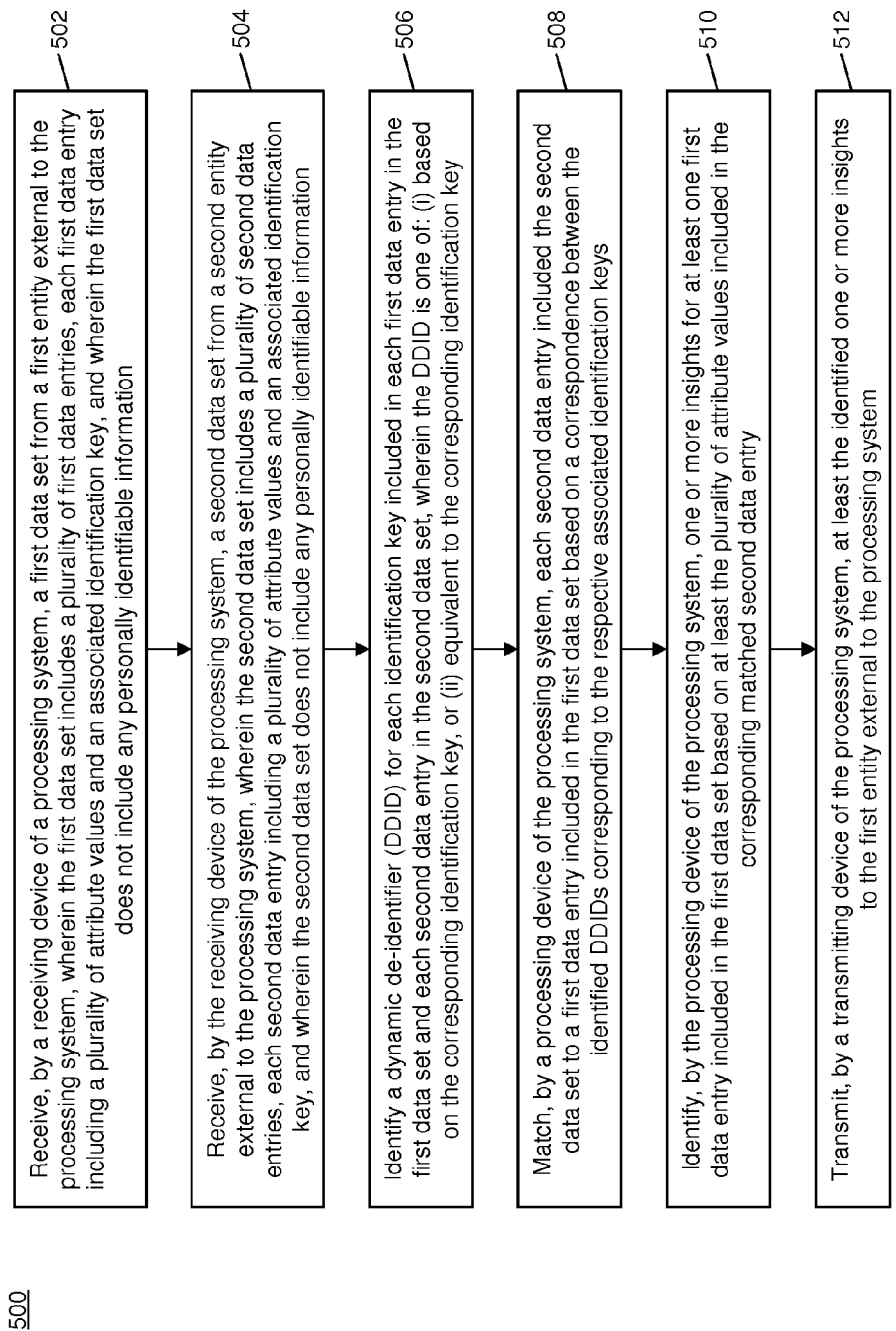
FIGS. 5 and 6 are flow charts illustrating exemplary methods for combining disparate data sets using dynamic de-identifiers in accordance with exemplary embodiments.

First Exemplary Method for Combining Disparate Data Sets Using Dynamic De-Identifiers FIG. 5 illustrates a method 500 for combining disparate data sets using dynamic de-identifiers without the use of personally identifiable information via the use of identification keys.

In step 502, a first data set may be received by a receiving device (e.g., the receiving unit 202) of a processing system (e.g., the processing system 102) from a first entity (e.g., the first data source 106) external to the processing system 102, wherein the first data set includes a plurality of first data entries, each first data entry including a plurality of attribute values and an associated identification key, and wherein the first data set does not include any personally identifiable information. In step 504, a second data set may be received by the receiving device 202 of the processing system 102 from a second entity (e.g., the second data source 108) external to the processing system 102, wherein the second data set includes a plurality of second data entries, each second data entry including a plurality of attribute values and an associated identification key, and wherein the second data set does not include any personally identifiable information.

In step 506, a dynamic de-identifier (DDID) may be identified for each identification key included in each first data entry in the first data set and each second data entry in the second data set, wherein the DDID is one of: (i) based on the corresponding identification key, or (ii) equivalent to the corresponding identification key. In step 508, each second data entry included in the second data set may be matched by a processing device (e.g., processing unit 204) of the processing system 102 to a first data entry included in the first data set based on a correspondence between the identified DDIDs corresponding to the respective associated identification keys.

In step 510, one or more insights may be identified by the processing device 204 of the processing system 102 for at least one first data entry included in the first data set based on at least the plurality of attribute values included in the corresponding matched second data entry. In step 512, at least the identified one or more insights may be transmitted by a transmitting device (e.g., the transmitting unit 206) of the processing system 102 to the first entity 106 external to the processing system 102.

In one embodiment, transmitting the identified one or more insights includes transmitting at least one of: the associated identification key and corresponding DDID for each of the at least one first data entry. In some embodiments, if the DDID is based on the corresponding identification key, the identification of a DDID for each identification key may be performed upon receipt of the respective data set such that the processing system 102 does not possess any identification keys. In one embodiment, each second data entry included in the second data set may be matched to a plurality of first data entries included in the first data set based on a correspondence between the identified DDIDs corresponding to the respective associated identification keys.

In some embodiments, the identification of a DDID for each identification key may be performed by the processing device 204 of the processing system 102. In one embodiment, the identification of a DDID for each identification key may be performed by a first processing device 204 of a first computing device (e.g., the first computing device 110) of the processing system 102, and the matching may be performed by a second processing device 204 of a second computing device (e.g., the second computing device 112) of the processing system 102. In a further embodiment, the second computing device 112 may not receive or possess any identification keys. In another further embodiment, the receiving device 202 may be included in the first computing device 110 of the processing system 102. In yet another further embodiment, the transmitting device 206 may be included in the first computing device 110 of the processing system 102. In another further embodiment, the first computing device 110 may not possess any data associated with the matching step.

Figure 6:
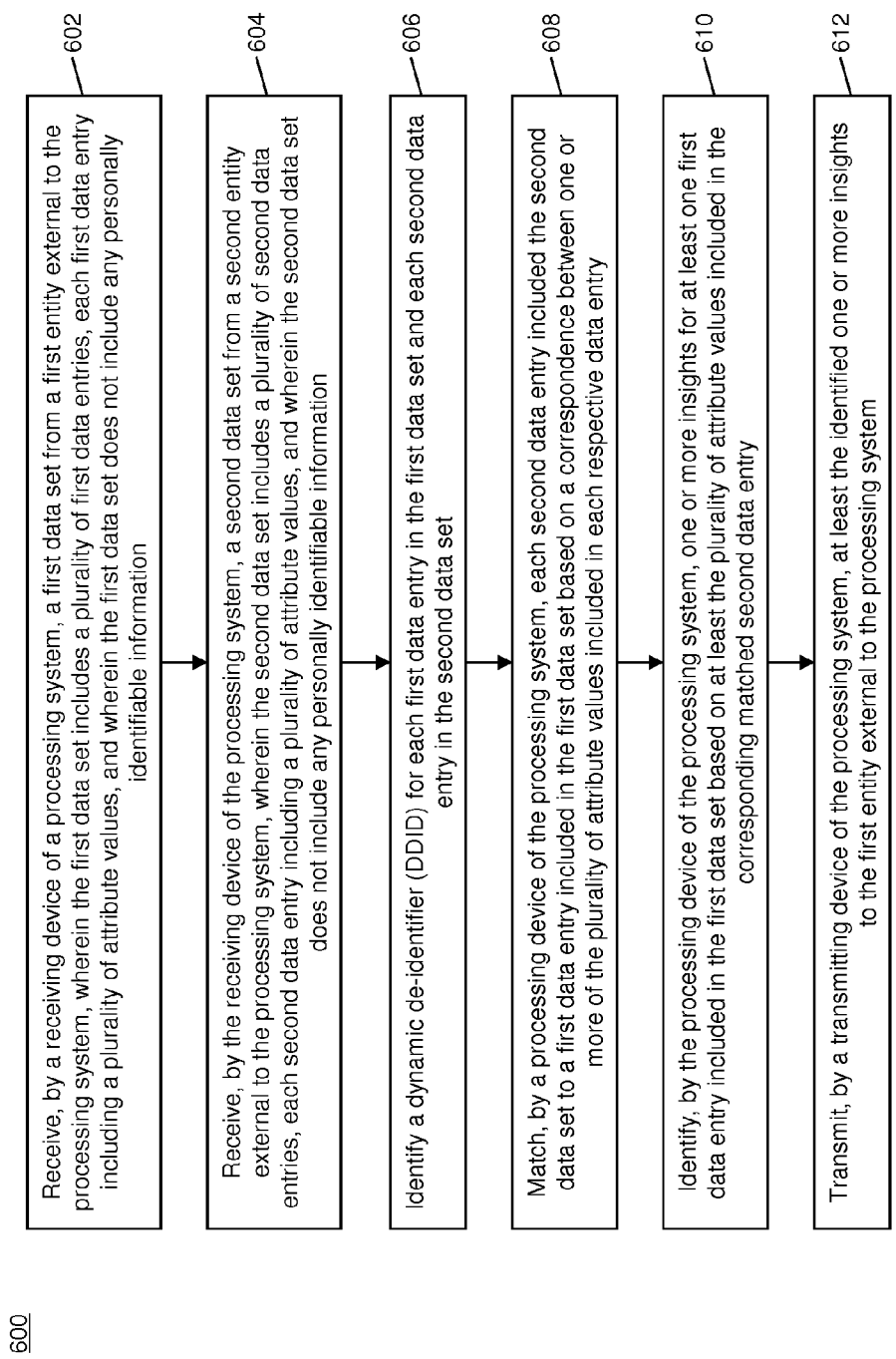

Second Exemplary Method for Combining Disparate Data Sets Using Dynamic De-Identifiers FIG. 6 illustrates a method 600 for combining disparate data sets using dynamic de-identifiers without the use of personally identifiable information without the use of identification keys.

In step 602, a first data set may be received by a receiving device (e.g., the receiving unit 202) of a processing system (e.g., the processing system 102) from a first entity (e.g., the first data source 106) external to the processing system 102, wherein the first data set includes a plurality of first data entries, each first data entry including a plurality of attribute values, and wherein the first data set does not include any personally identifiable information. In step 604, a second data set may be received by the receiving device 202 of the processing system 102 from a second entity (e.g., the second data source 108) external to the processing system 102, wherein the second data set includes a plurality of second data entries, each second data entry including a plurality of attribute values, and wherein the first data set does not include any personally identifiable information.

In step 606, a dynamic de-identifier (DDID) may be identified for each first data entry in the first data set and each second data entry in the second data set. In step 608, each second data entry included in the second data set may be matched by a processing device (e.g., processing unit 204) of the processing system 102 to a first data entry included in the first data set based on a correspondence between one or more of the plurality of attribute values included in each respective data entry.

In step 610, one or more insights for at least one first data entry included in the first data set may be identified by the processing device 204 of the processing system 102 based on at least the plurality of attribute values included in the corresponding matched second data entry. In step 612, at least the identified one or more insights may be transmitted by a transmitting device (e.g., the transmitting unit 206) of the processing system 102 to the first entity 106 external to the processing system 102.

In one embodiment, transmitting the identified one or more insights may include transmitting the DDID associated with each of the at least one first data entry. In some embodiments, the identification of a DDID for each first data entry and each second data entry may be performed by the processing device 204 of the computing device 104. In one embodiment, each second data entry included in the second data set may be matched to a plurality of first data entries included in the first data set based on the correspondence between one or more of the plurality of attribute values included in each respective data entry.

In some embodiments, the identification of a DDID for each first data entry and each second data entry may be performed by a first processing device 204 of a first computing device (e.g., the first computing device 110) of the processing system 102, and the matching may be performed by a second processing device 204 of a second computing device (e.g., the second computing device 112) of the processing system 102. In a further embodiment, the second computing device 112 may not receive or possess any DDIDs. In another further embodiment, the receiving device 202 may be included in the first computing device 110 of the processing system 102. In yet another further embodiment, the transmitting device 206 may be included in the first computing device 110 of the processing system 102. In another further embodiment, the first computing device 110 may not possess any data associated with the matching step.

Computer System Architecture

Figure 7:
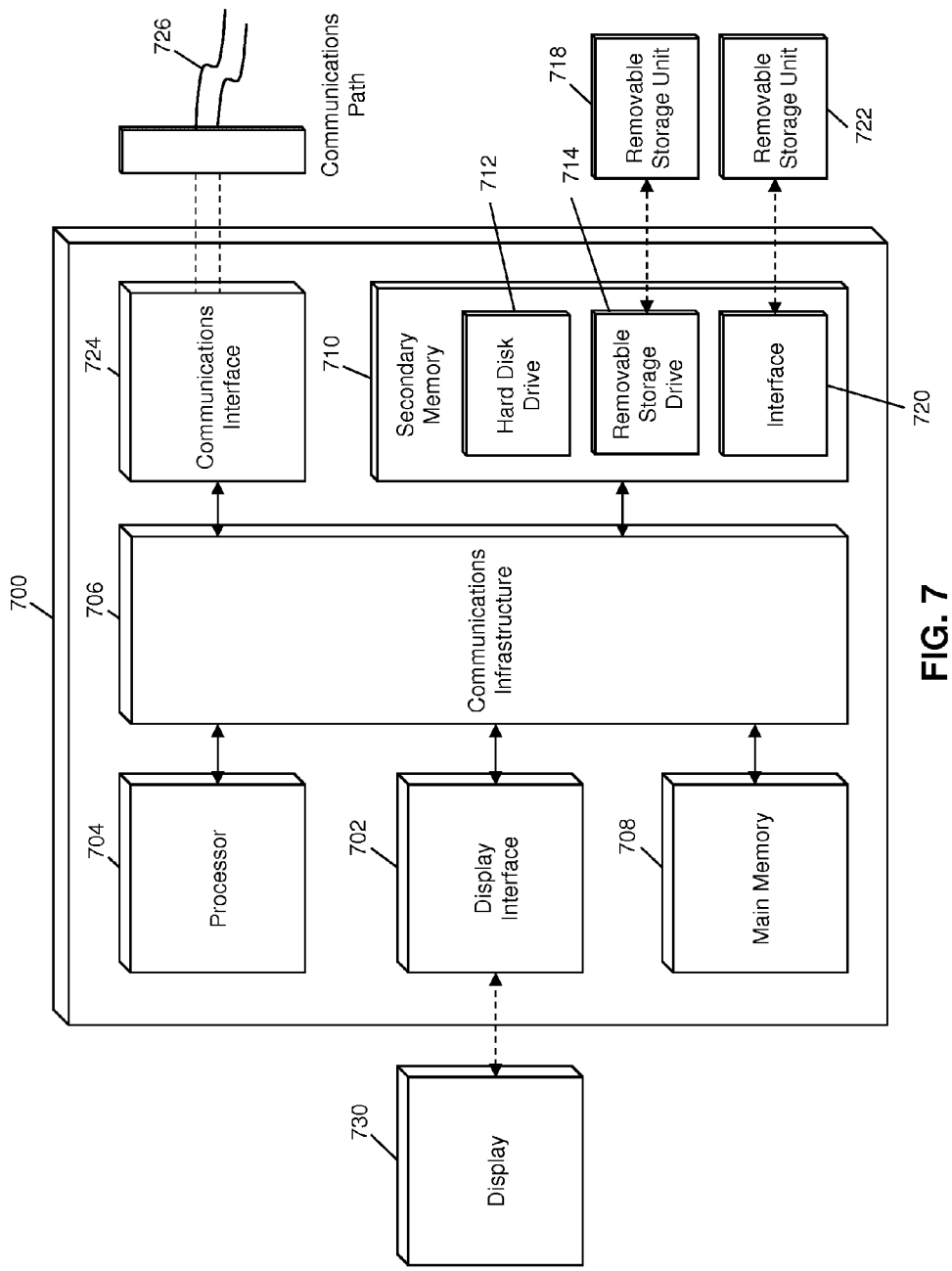
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 104 of FIG. 1A and first computing device 110 and second computing device 112 of FIG. 1B may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for combining disparate data sets using dynamic de-identifiers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for combining disparate data sets using dynamic de-identifiers, comprising:
   receiving, by a receiving device of a processing system, a first data set from a first entity external to the processing system, wherein the first data set includes a plurality of first data entries, each first data entry including a plurality of attribute values and an associated identification key, and wherein the first data set does not include any personally identifiable information;
   receiving, by the receiving device of the processing system, a second data set from a second entity external to the processing system, wherein the second data set includes a plurality of second data entries, each second data entry including a plurality of attribute values and an associated identification key, and wherein the second data set does not include any personally identifiable information;
   identifying a dynamic de-identifier (DDID) for each identification key included in each first data entry in the first data set and each second data entry in the second data set, wherein the DDID is one of: (i) based on the corresponding identification key, or (ii) equivalent to the corresponding identification key;
   matching, by a processing device of the processing system, each second data entry included the second data set to a first data entry included in the first data set based on a correspondence between the identified DDIDs corresponding to the respective associated identification keys and a measurement of commonality between the plurality of attribute values of each first data entry and the plurality of attribute values of each second data entry, wherein the matching is based on the measurement of commonality being higher than a threshold;
   identifying, by the processing device of the processing system, one or more insights for at least one first data entry included in the first data set based on at least the plurality of attribute values included in the corresponding matched second data entry; and
   transmitting, by a transmitting device of the processing system, at least the identified one or more insights to the first entity external to the processing system.

2. The method of claim 1, wherein transmitting the identified one or more insights includes transmitting at least one of: the associated identification key and corresponding DDID for each of the at least one first data entry.

3. The method of claim 1, wherein the identification of a DDID for each identification key is performed by the processing device of the processing system.

4. The method of claim 1, wherein
   the identification of a DDID for each identification key is performed by a first processing device of a first computing device of the processing system, and
   the matching is performed by a second processing device of a second computing device of the processing system.

5. The method of claim 4, wherein the second computing device does not receive or possess any identification keys.

6. The method of claim 4, wherein the receiving device is included in the first computing device of the processing system.

7. The method of claim 4, wherein the transmitting device is included in the first computing device of the processing system.

8. The method of claim 4, wherein the first computing device does not possess any data associated with the matching step.

9. The method of claim 1, wherein if the DDID is based on the corresponding identification key, the identification of a DDID for each identification key is performed upon receipt of the respective data set, and
   wherein the processing system does not possess any identification keys.

10. The method of claim 1, wherein each second data entry included in the second data set is matched to a plurality of first data entries included in the first data set based on the correspondence between the identified DDIDs corresponding to the respective associated identification keys.

11. A method for combining disparate data sets using dynamic de-identifiers, comprising:
receiving, by a receiving device of a processing system, a first data set from a first entity external to the processing system, wherein the first data set includes a plurality of first data entries, each first data entry including a plurality of attribute values, and wherein the first data set does not include any personally identifiable information;
receiving, by the receiving device of the processing system, a second data set from a second entity external to the processing system, wherein the second data set includes a plurality of second data entries, each second data entry including a plurality of attribute values, and wherein the second data set does not include any personally identifiable information;
identifying a dynamic de-identifier (DDID) for each first data entry in the first data set and each second data entry in the second data set;
matching, by a processing device of the processing system, each second data entry included in the second data set to a first data entry included in the first data set based on a measurement of commonality between one or more of the plurality of attribute values included in each first respective data entry and one or more of the plurality of attribute values included in each second data entry, wherein the matching is based on the measurement of commonality being higher than a threshold;
identifying, by the processing device of the processing system, one or more insights for at least one first data entry included in the first data set based on at least the plurality of attribute values included in the corresponding matched second data entry; and
transmitting, by a transmitting device of the processing system, at least the identified one or more insights to the first entity external to the processing system.

12. The method of claim 11, transmitting the identified one or more insights includes transmitting the DDID associated with each of the at least one first data entry.

13. The method of claim 11, wherein the identification of a DDID for each first data entry and each second data entry is performed by the processing device of the processing system.

14. The method of claim 11, wherein
the identification of a DDID for each first data entry and each second data entry is performed by a first processing device of a first computing device of the processing system, and
the matching is performed by a second processing device of a second computing device of the processing system.

15. The method of claim 14, wherein the second computing device does not receive or possess any DDIDs.

16. The method of claim 14, wherein the receiving device is included in the first computing device of the processing system.

17. The method of claim 14, wherein the transmitting device is included in the first computing device of the processing system.

18. The method of claim 14, wherein the first computing device does not possess any data associated with the matching step.

19. The method of claim 11, wherein each second data entry included in the second data set is matched to a plurality of first data entries included in the first data set based on the correspondence between one or more of the plurality of attribute values included in each respective data entry.

20. The method of claim 11, wherein each first data entry included in the first data set further includes an associated identification key.

21. The method of claim 20, wherein the identified DDID for each first data entry in the first data set is based on the associated identification key.

22. A system for combining disparate data sets using dynamic de-identifiers, comprising:
a receiving device of a processing system configured to receive
a first data set from a first entity external to the processing system, wherein the first data set includes a plurality of first data entries, each first data entry including a plurality of attribute values and an associated identification key, and wherein the first data set does not include any personally identifiable information, and
a second data set from a second entity external to the processing system, wherein the second data set includes a plurality of second data entries, each second data entry including a plurality of attribute values and an associated identification key, and wherein the second data set does not include any personally identifiable information;
a first processing device of the processing system configured to identify a dynamic de-identifier (DDID) for each identification key included in each first data entry in the first data set and each second data entry in the second data set, wherein the DDID is one of: (i) based on the corresponding identification key, or (ii) equivalent to the corresponding identification key;
a second processing device of the processing system configured to
match each second data entry included the second data set to a first data entry included in the first data set based on a correspondence between the identified DDIDs corresponding to the respective associated identification keys and a measurement of commonality between the plurality of attribute values of each first data entry and the plurality of attribute values of each second data entry, wherein the match is based on the measurement of commonality being higher than a threshold, and
identify one or more insights for at least one first data entry included in the first data set based on at least the plurality of attribute values included in the corresponding matched second data entry; and
a transmitting device of the processing system configured to transmit at least the identified one or more insights to the first entity external to the processing system.

23. The system of claim 22, wherein transmitting the identified one or more insights includes transmitting at least one of: the associated identification key and corresponding DDID for each of the at least one first data entry.

24. The system of claim 22, wherein the first processing device and the second processing device are a single processing device.

25. The system of claim 22, wherein
the first processing device is included in a first computing device of the processing system, and
the second processing device is included in a second computing device of the processing system.

26. The system of claim 25, wherein the second computing device does not receive or possess any identification keys.

27. The system of claim 25, wherein the receiving device is included in the first computing device of the processing system.

28. The system of claim 25, wherein the transmitting device is included in the first computing device of the processing system.

29. The system of claim 25, wherein the first computing device does not possess any data associated with the matching step.

30. The system of claim 22,
wherein if the DDID is based on the corresponding identification key, the identification of a DDID for each identification key is performed upon receipt of the respective data set, and
wherein the processing system does not possess any identification keys.

31. The system of claim 22, wherein each second data entry included in the second data set is matched to a plurality of first data entries included in the first data set based on the correspondence between the identified DDIDs corresponding to the respective associated identification keys.

32. A system for combining disparate data sets using dynamic de-identifiers, comprising:
a receiving device of a processing system configured to receive
a first data set from a first entity external to the processing system, wherein the first data set includes a plurality of first data entries, each first data entry including a plurality of attribute values, and wherein the first data set does not include any personally identifiable information, and
a second data set from a second entity external to the processing system, wherein the second data set includes a plurality of second data entries, each second data entry including a plurality of attribute values, and wherein the second data set does not include any personally identifiable information;
a first processing device of the processing system configured to identify a dynamic de-identifier (DDID) for each first data entry in the first data set and each second data entry in the second data set;
a second processing device of the processing system configured to
match each second data entry included the second data set to a first data entry included in the first data set based on a measurement of commonality between one or more of the plurality of attribute values included in each first respective data entry and one or more of the plurality of attribute values included in each second data entry, wherein the match is based on the measurement of commonality being higher than a threshold, and
identify one or more insights for at least one first data entry included in the first data set based on at least the plurality of attribute values included in the corresponding matched second data entry; and
a transmitting device of the processing system configured to transmit at least the identified one or more insights to the first entity external to the processing system.

33. The system of claim 32, transmitting the identified one or more insights includes transmitting the DDID associated with each of the at least one first data entry.

34. The system of claim 32, wherein the first processing device and the second processing device are a single processing device.

35. The system of claim 32, wherein
the first processing device is included in a first computing device of the processing system, and
the second processing device is included in a second computing device of the processing system.

36. The system of claim 35, wherein the second computing device does not receive or possess any DDIDs.

37. The system of claim 35, wherein the receiving device is included in the first computing device of the processing system.

38. The system of claim 35, wherein the transmitting device is included in the first computing device of the processing system.

39. The system of claim 35, wherein the first computing device does not possess any data associated with the matching step.

40. The system of claim 32, wherein each second data entry included in the second data set is matched to a plurality of first data entries included in the first data set based on the correspondence between one or more of the plurality of attribute values included in each respective data entry.

41. The system of claim 32, wherein each first data entry included in the first data set further includes an associated identification key.

42. The system of claim 41, wherein the identified DDID for each first data entry in the first data set is based on the associated identification key.

* * * * *